(12) United States Patent
Lyle

(10) Patent No.: US 8,561,019 B2
(45) Date of Patent: Oct. 15, 2013

(54) SYSTEM AND METHOD FOR DATA ABSTRACTION USING FORMATTED SYSTEM VARIABLES

(75) Inventor: James G. Lyle, Overland Park, KS (US)

(73) Assignee: Adaptive Intelligence LLC, Overland Park, KS (US)

( * ) Notice: Subject to any disclaimer, the term of this patent is extended or adjusted under 35 U.S.C. 154(b) by 1415 days.

(21) Appl. No.: 11/502,849

(22) Filed: Aug. 11, 2006

(65) Prior Publication Data

US 2008/0126291 A1 May 29, 2008

(51) Int. Cl.
*G06F 9/44* (2006.01)

(52) U.S. Cl.
USPC ............................. 717/111; 717/106; 717/142

(58) Field of Classification Search
None
See application file for complete search history.

(56) References Cited

U.S. PATENT DOCUMENTS

| | | | | | |
|---|---|---|---|---|---|
| 5,459,827 | A * | 10/1995 | Allouche et al. | ............... | 715/204 |
| 5,768,590 | A * | 6/1998 | Kimura et al. | ................ | 717/106 |
| 5,813,019 | A * | 9/1998 | Van De Vanter | .............. | 717/111 |
| 5,815,713 | A * | 9/1998 | Sanders | ........................ | 717/106 |
| 5,842,020 | A * | 11/1998 | Faustini | ........................ | 717/111 |
| 5,857,212 | A * | 1/1999 | Van De Vanter | .............. | 717/111 |
| 5,875,332 | A * | 2/1999 | Wang et al. | .................... | 717/106 |
| 5,897,622 | A * | 4/1999 | Blinn et al. | ..................... | 705/26 |
| 5,930,512 | A * | 7/1999 | Boden et al. | ................... | 717/142 |
| 6,061,513 | A * | 5/2000 | Scandura | ...................... | 717/142 |
| 6,120,553 | A * | 9/2000 | Sidwell | ........................ | 717/142 |
| 6,356,887 | B1 * | 3/2002 | Berenson et al. | ..................... | 1/1 |
| 6,601,234 | B1 * | 7/2003 | Bowman-Amuah | .......... | 717/108 |
| 6,615,199 | B1 * | 9/2003 | Bowman-Amuah | ............ | 706/50 |
| 6,615,253 | B1 * | 9/2003 | Bowman-Amuah | .......... | 709/219 |
| 2001/0034849 | A1 * | 10/2001 | Powers | ......................... | 713/202 |
| 2002/0049788 | A1 * | 4/2002 | Lipkin et al. | .................. | 707/513 |
| 2002/0178078 | A1 * | 11/2002 | OToole | ............................ | 705/26 |
| 2004/0015408 | A1 * | 1/2004 | Rauen et al. | ..................... | 705/26 |
| 2004/0134369 | A1 * | 7/2004 | East | ............................... | 101/483 |
| 2005/0039119 | A1 * | 2/2005 | Parks et al. | .................... | 715/515 |
| 2005/0216830 | A1 * | 9/2005 | Turner et al. | .................. | 715/513 |
| 2006/0190434 | A1 * | 8/2006 | Dettinger et al. | ................ | 707/3 |
| 2007/0083495 | A1 * | 4/2007 | Dettinger et al. | ................ | 707/3 |
| 2010/0333077 | A1 * | 12/2010 | Shachar et al. | ............... | 717/142 |

OTHER PUBLICATIONS

Motomichi Toyama et al. , "Advances in Database Technology EDBT'98" , Springer Berlin Heidelber , 1998 , <http://link.springer.com/content/pdf/10.1007%2FBFb0101002.pdf> pp. 1-15.*

(Continued)

*Primary Examiner* — Thuy Dao
*Assistant Examiner* — Samuel Hayim
(74) *Attorney, Agent, or Firm* — Lathrop & Gage LLP

(57) ABSTRACT

A system, method and software product retrieve a formatted data value from a data layer to a business logic layer by invoking a formatted variable abstraction procedure from the business logic layer, passing at least one parameter to the formatted variable abstraction procedure (the at least one parameter identifying a formatted system variable), and building a dynamic statement based upon the formatted system variable such that execution of the dynamic statement: accesses a formatted variable table based upon the formatted system variable to locate information relating to the formatted system variable; retrieves one or more data items based upon the information; formats the data items to form the formatted data value based upon the information; and returns the formatted data value to the business logic layer.

22 Claims, 9 Drawing Sheets

(56) References Cited

OTHER PUBLICATIONS

Rekha Bhowmik et al., "Managing Reference Tables Using Oracle Dynamic SQL and Metadata", IEEE, 2003, <http://ieeexplore.ieee.org/stamp/stamp.jsp?tp=&arnumber=1270646> pp. 399-403.*

Russel A. McClure et al., "SQL DOM: Compile Time Checking of Dynamic SQL Statements", ACM, 2005, <http://delivery.acm.org/10.1145/1070000/1062487/p88-mcclure.pdf>, pp. 1-9.*

* cited by examiner

Table:  FORMATTED_VARIABLES

| DATABASE COLUMN NAME | NULL? | DATA TYPE |
|---|---|---|
| ID | NOT NULL | NUMBER(28) |
| TAG_NAME | NOT NULL | VARCHAR2(30) |
| PROG_ID | NOT NULL | NUMBER(28) |
| IMAGE | NOT NULL | VARCHAR2(1) |
| IMAGE_FILE_FORMAT | | VARCHAR2(2) |
| DATA_TYPE | NOT NULL | VARCHAR2(1) |
| ST_TABLE_SHORT_NAME | NOT NULL | VARCHAR2(10) |
| SOURCE_DATA_ST_TABLE_NAME | NOT NULL | VARCHAR2(10) |
| USER_MODIFIABLE | NOT NULL | VARCHAR2(1) |
| ALTERNATE_FIXED_VALUE | | VARCHAR2(4000) |
| SHORT_DESCRIPTION | | VARCHAR2(200) |

FIG. 5

Table:  PROGRAMS

| DATABASE COLUMN NAME | NULL? | DATA TYPE |
|---|---|---|
| ID | NOT NULL | NUMBER(28) |
| PACKAGE_NAME | | VARCHAR2(30) |
| PROGRAM_NAME | NOT NULL | VARCHAR2(30) |
| PROGRAM_TYPE | NOT NULL | VARCHAR2(1) |
| PROGRAM_TITLE | NOT NULL | VARCHAR2(50) |
| DESCRIPTION | | VARCHAR2(4000) |
| NOTES | | VARCHAR2(4000) |

FIG. 6

Table:  SYSTEM_TABLES

| DATABASE COLUMN NAME | NULL? | DATA TYPE |
|---|---|---|
| TABLE_SHORT_NAME | NOT NULL | VARCHAR2(10) |
| TABLE_NAME | NOT NULL | VARCHAR2(30) |
| DISPLAY_NAME | NOT NULL | VARCHAR2(50) |
| TABLE_EXISTS | NOT NULL | VARCHAR2(1) |

FIG. 7

```
PROCEDURE AIS_P009_GET_FV
 (P_TAG_NAME IN FORMATTED_VARIABLES.TAG_NAME%TYPE
 ,P_KEY_VALUE IN OUT NUMBER
 ,P_SUBJECT_KEY_VALUE IN OUT NUMBER
 ,P_IMAGE IN OUT VARCHAR2
 ,P_RETURN_STATUS IN OUT VARCHAR2
 ,P_RETURN_VALUE IN OUT VARCHAR2
 )
 IS
plsql_block              varchar2(500);
l_package_name           varchar2(30);
l_program_name           varchar2(30);
l_alternate_fixed_value  varchar2(4000);
BEGIN
   select prog.package_name
         ,prog.program_name
         ,fv.image
         ,fv.alternate_fixed_value
   into l_package_name
       ,l_program_name
       ,p_image
       ,l_alternate_fixed_value
   from formatted_variables fv
       ,programs prog
   where fv.tag_name = p_tag_name
   and fv.prog_id = prog.id;
   if upper(l_package_name) != 'NOOP' then
      plsql_block := 'begin '||l_package_name||'.'||l_program_name;
      plsql_block := plsql_block||'(:1,:2,:3,:4); end;';
      execute immediate plsql_block using in out p_key_value
                                          ,in out p_subject_key_value
                                          ,in out p_return_status
                                          ,in out p_return_value;
   else
      p_return_value := l_alternate_fixed_value;
      p_return_status := 'SUCCEED';
   end if;
END AIS_P009_GET_FV;
```

FIG. 8

```
PACKAGE: AIS_P008_SYS_VALUES v$_formatted_value varchar2(30000);

procedure status_fail
    (p_return_status in out varchar2
    ,p_return_value in out varchar2)
IS
BEGIN
    p_return_value := null;
    p_return_status := 'FAIL';
end status_fail;

procedure chk_length
    (p_return_status in out varchar2
    ,p_return_value in out varchar2)
IS
BEGIN
    if length(v$_formatted_value)<4000 then
        p_return_value := v$_formatted_value;
        p_return_status := 'SUCCEED';
    else
        p_return_value := null;
        p_return_status := 'OVERFLOW';
    end if;
end chk_length;

procedure long_date
    (p_key_value in number
    ,p_subject_key_value in out number
    ,p_return_status out varchar2
    ,p_return_value out varchar2)
IS
BEGIN
    select rtrim(to_char(sysdate,'Month'))
           ||to_char(sysdate,' dd, YYYY')
    into v$_formatted_value
    from dual;
    chk_length(p_return_status, p_return_value);
EXCEPTION
    when NO_DATA_FOUND then
        status_fail(p_return_status, p_return_value);
end long_date;
```

*FIG. 9*

```
PACKAGE: AIS_P007_CLAIM_CHARGE_VALUES
-- NOTE:  entry point of this package is the claim_charges table.
v$_formatted_value    varchar2(4000);
v$_subject_key_value  number;

procedure status_fail
    (p_return_status in out varchar2
    ,p_return_value in out varchar2)
IS
BEGIN
    p_return_value := null;
    p_return_status := 'FAIL';
end status_fail;

procedure chk_length
    (p_return_status in out varchar2
    ,p_return_value in out varchar2)
IS
BEGIN
    if length(v$_formatted_value) < 4000 then
        p_return_value := v$_formatted_value;
        p_return_status := 'SUCCEED';
    else
        p_return_value := null;
        p_return_status := 'OVERFLOW';
    end if;
end chk_length;

procedure insured_first_name
    (p_key_value in number
    ,p_subject_key_value in out number
    ,p_return_status out varchar2
    ,p_return_value out varchar2)
IS
BEGIN
    select pep.first_name
          ,pep.id
    into v$_formatted_value
        ,v$_subject_key_value
    from people    pep
        ,insureds   I
        ,claim_charges   clc
    where clc.id = p_key_value
      and clc.i_id = i.id
      and i.pep_id = pep.id;
    chk_length(p_return_status, p_return_value);
    p_subject_key_value := v$_subject_key_value;
EXCEPTION
    when NO_DATA_FOUND then
        status_fail(p_return_status, p_return_value);
end insured_first_name;
```

FIG. 10

SYSTEM AND METHOD FOR DATA ABSTRACTION USING FORMATTED SYSTEM VARIABLES

BACKGROUND

Selected data structures and process logic combine to form a useful computing system. This computing system may further contain useful sub-systems, each of which is re-usable and belongs to one of the following three architectural tiers.

First Tier:

The first tier contains database objects and processes that are common to most commercial data processing computer systems. This level is the infrastructure that supports capabilities such as user authentication and access security, workflow, document management, data journaling, information regarding people and organizations, address management, etc.

Second Tier:

The second tier contains database objects and processes that are common to most business administration processes regardless of specific commercial industry. This level supports capabilities such as automated correspondence, customer billing, cash processing, general ledger accounting, etc.

Third Tier:

The third tier contains database objects and processes that are specific to a commercial business such as the insurance industry. Many of these system resources are shareable among different insurance products, but some are specific to an insurance product line. This level includes capabilities such as calculation of health insurance premium rates or submitted claim benefit determination. Capabilities that are specific to a business and/or product can often be added as plug-ins to the current architecture (e.g. banking industry— calculation of savings account interest earnings).

FIG. 1 is a block diagram of a responsibility-based layering system 10 illustrating prior art hierarchical dependence between layers. System 10 has a presentation layer 12, a business logic layer 14 and a data access layer 16. Business logic layer 14 and data access layer 16 are illustratively shown within a database 24. Data access layer 16 is illustratively shown with tables 26. Business logic layer 14 is illustratively shown with business logic 20 that includes a data selection function 22 within stored procedures 28 of database 24. Data selection function 22 may, for example, select certain data items from data access layer 16 for display to a user. Presentation layer 12 includes presentation logic 18 that controls the formatting of visual objects used to input or display data; it is illustratively shown generating view of data 19, which represents a view of the data items selected by business logic layer 14 for presentation to the user.

In particular, presentation logic 18 controls the formatting of visual objects used to input or display data. This includes forms (display screens), reports, e-mail, and other presentation methods. Business logic 20, within business logic layer 14, that typically controls process flow, validates data values, calculates values, etc. As much as possible, program code that supports business logic 20 is separated from the program code that supports presentation logic 18. Functionality of business logic 20 is often included within stored procedures of database 24 or in shared libraries. Data access layer 16 facilitates storage of business data structures and data separate from program logic. Business data often describe rules that define how processes are to be performed. Program logic changes are not normally required to support such things as product changes because system 10 is designed to be "data driven".

Data access layer 16 includes logic that enforces data integrity constraints upon data stored within tables 26. Database triggers associated with tables 26 perform this logic.

In an example of operation, data selection function 22 invokes one or more stored procedures of database 24 to retrieve certain information from tables 26 that is then displayed to a user by presentation logic 18 of presentation layer 12. If implementation of database 24 within data access layer 16 changes (e.g., a different database is used), data selection function 22 of business logic layer 14 also needs to change since underlying structure of tables 26 may introduce new data selection criteria. Such changes typically cost development time for business logic layer 14, even though business logic layer 14 selects the same data from the database.

SUMMARY OF THE INVENTION

In one embodiment, a method retrieves a formatted data value from a data layer to a business logic layer. The method invokes a formatted variable abstraction procedure from the business logic layer, passes at least one parameter to the formatted variable abstraction procedure (the at least one parameter identifying a formatted system variable), and builds a dynamic statement based upon the formatted system variable such that execution of the dynamic statement: accesses a formatted variable table based upon the formatted system variable to locate information relating to the formatted system variable; retrieves one or more data items based upon the information; formats the data items to form the formatted data value based upon the information; and returns the formatted data value to the business logic layer.

In another embodiment, a method abstracts data between a business logic layer and a data layer. The method invokes a data abstraction procedure from the business logic layer with at least one parameter identifying a formatted system variable; accesses, from the data abstraction procedure, a first database table to retrieve a package name and program name based upon the formatted system variable; builds a dynamic statement within the data abstraction procedure (if the package name and program name indicate a valid procedure) that, upon execution, invokes the procedure to retrieve a formatted data value; retrieves the formatted data value from the first database table based upon the formatted system variable if the package name and program name does not indicate the valid procedure; and returns the formatted data value to the business logic layer.

In another embodiment, a software product has instructions, stored on computer-readable media, wherein the instructions, when executed by a computer, perform steps for data abstraction between a business logic layer and a data layer, including: instructions for invoking a data abstraction procedure from the business logic layer with at least one parameter identifying a formatted system variable; instructions for accessing, from the data abstraction procedure, a first database table to retrieve a package name and program name based upon the formatted system variable; instructions for building, if the package name indicates a valid package, a dynamic statement within the data abstraction procedure that, upon execution, invokes a procedure, identified by the program name and the package name, to retrieve a formatted data value; instructions for retrieving, if the package name does not indicate a valid package, the formatted data value from the first database table based upon the formatted system variable; and instructions for returning the formatted data value to the business logic layer.

In another embodiment, a system abstracts data between a business logic layer and a data layer, including: means for invoking a formatted variable abstraction procedure from the business logic layer; means for passing at least one parameter to the formatted variable abstraction procedure, the at least one parameter identifying a formatted system variable; and means for building a dynamic statement based upon the formatted system variable such that execution of the dynamic statement: accesses a formatted variable table based upon the formatted system variable to locate information relating to the formatted system variable; retrieves one or more data items based upon the information; formats the data items to form the formatted data value based upon the information; and returns the formatted data value to the business logic layer.

BRIEF DESCRIPTION OF THE FIGURES

FIG. 5 is a table description listing columns of a database table named FORMATTED_VARIABLES.

FIG. 6 is a table description listing columns of a database table named PROGRAMS.

FIG. 7 is a table description listing columns of a database table named SYSTEM_TABLES.

FIG. 8 shows exemplary source code for a procedure called AIS_P009_GET_FV.

FIG. 9 shows exemplary source code for a package called AIS_P008_SYS_VALUES.

FIG. 10 shows exemplary source code for a package called AIS_P007_CLAIM_CHARGE_VALUES.

DETAILED DESCRIPTION OF THE FIGURES

Systems and methods disclosed hereinbelow were originally designed to solve a letter-processing problem. System-generated letters, known as dynamic letters, often use data values from a database that are merged into the letter. These dynamic letters do not have hard coded logic that is specific to each letter for retrieving the data values. Dynamic letters may, for example, include fields that reference variables by name. By creating 'formatted system variables' that access the database and return formatted data, any complexity related to the retrieval of data from the database is hidden from the business logic layer. These formatted system variables can be used by any program that requires properly formatted specific values retrieved from the database. For example, dynamic letters, generated by the system, may contain one or more references to one or more formatted system variables. Use of formatted system variables standardizes the nature of the data retrieval as described in further detail below.

Formatted system variables may also be used to display a list of relevant values associated with a business transaction. This list allows a user to see related data without having to navigate to other inquiry screens, for example. In another example, the list may be specific to a type of transaction. In yet another example, formatted system variables may be used as a convenient way to share complex logic used to retrieve one or more values.

Software used with the system may serve to organize logic and data into separate layers, as listed below. Altogether, the system may provide certain advantages that are independent of technology platform; in particular, although not entirely independent, each layer is substantially unchanged if the technology used for another layer is changed. For example, if JAVA replaces Oracle Forms for presentation, then the business logic layer is unaffected.

Formatted system variables are used within the business logic layer and are part of the first architectural tier. Business logic in the second and third architectural tiers may also benefit from systems and methods described herein as a convenient data access utility.

Figure 1:
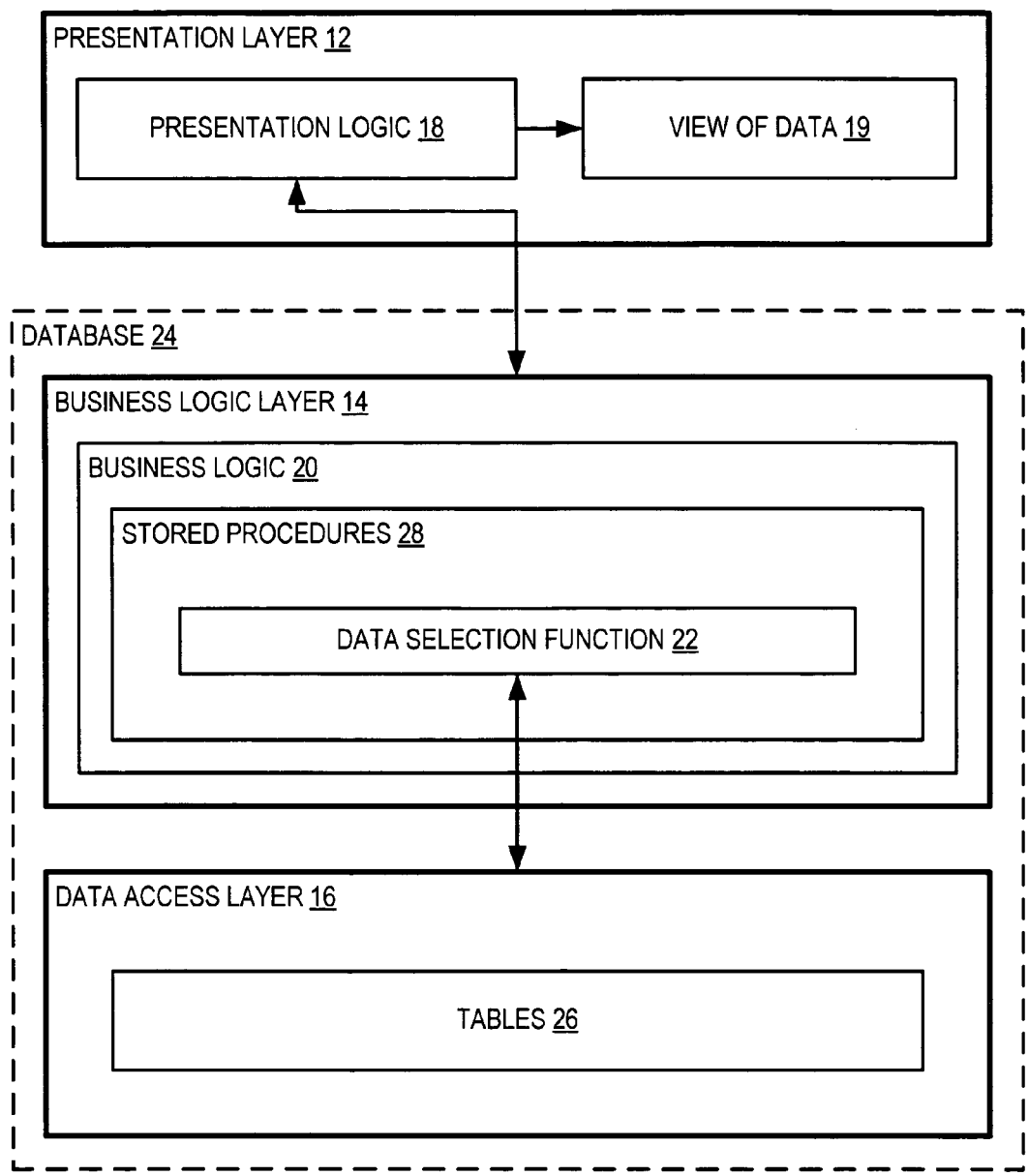
FIG. 1 is a block diagram of responsibility-based layering illustrating prior art hierarchical dependence between layers.
Figure 2:
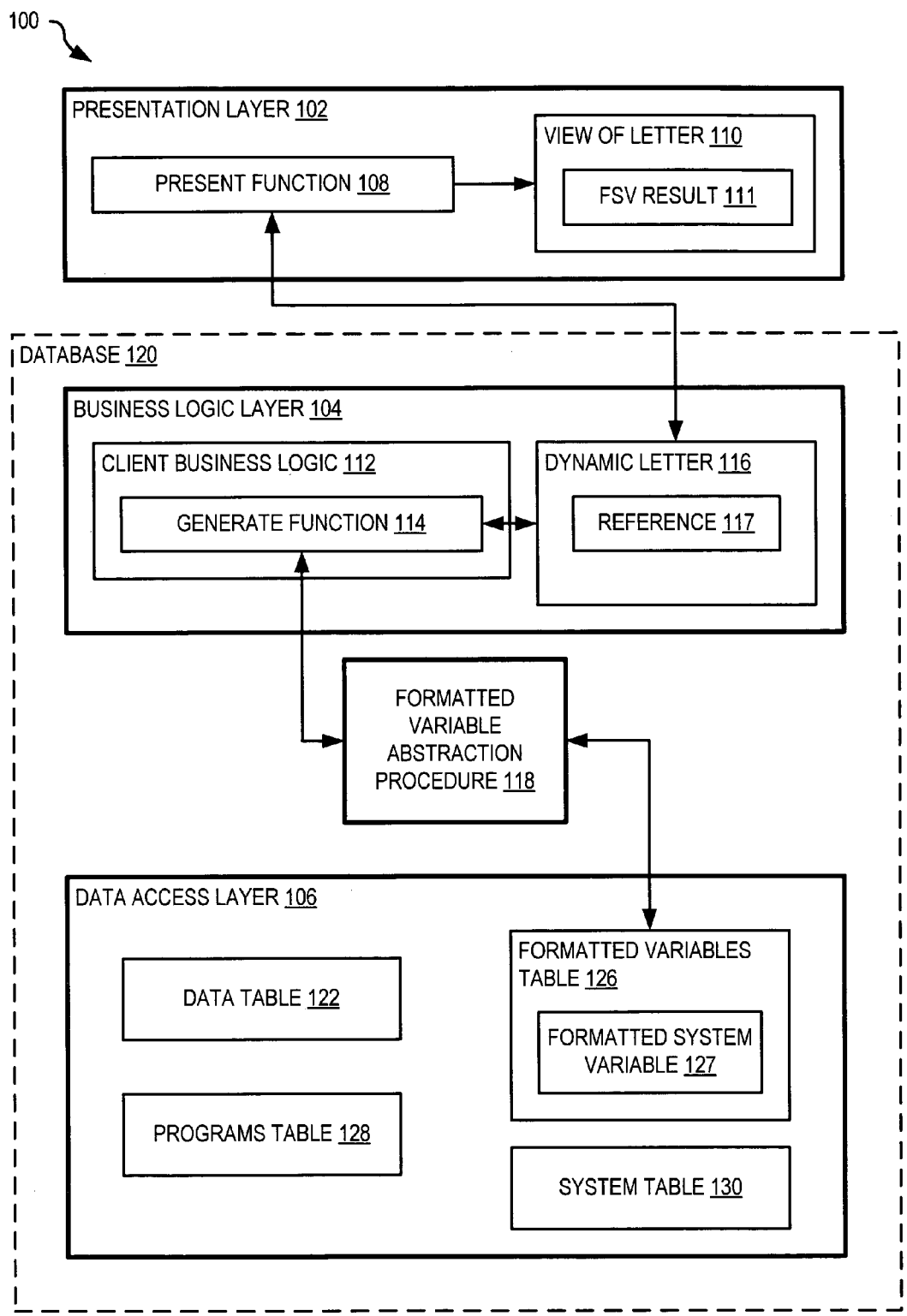
FIG. 2 is a data flow diagram of responsibility-based layering system illustrating abstraction of hierarchical dependence between a business logic layer and a data access layer.

FIG. 2 is a data flow diagram of a responsibility-based layering system 100 illustrating abstraction of hierarchical dependence between a business logic layer 104 and a data access layer 106. Business logic layer 104 and data access layer 106 are illustratively shown within a database 120. Layering system 100 also shows a presentation layer 102, illustratively shown with a present function 108 generating a view of letter 110. Business logic layer 104 is illustratively shown with a client business logic 112 and a dynamic letter 116; client business logic 112 includes a generate function 114. Data access layer 106 is illustratively shown with a data table 122, a formatted variables table 126, a programs table 128 and a system table 130.

In an example of operation, generate function 114, within client business logic 112, generates dynamic letter 116 that includes a reference 117. Based upon reference 117, generate function 114 accesses a formatted variable abstraction procedure 118 that then accesses formatted variables table 126 to locate a formatted system variable 127 identified by reference 117. Formatted system variable 127 may include instructions for accessing one or more of data table 122, programs table 128 and system table 130 to determine a formatted system value result 111 that is passed back to generate function 114 for inclusion into dynamic letter 116. Letter 110 may then be viewed by operation of present function 108 within presentation layer 102. Since generate function 114 accesses formatted variable abstraction procedure 118, it may not utilize specific knowledge of database 120 (i.e., knowledge of data table 122, programs table 128 or system table 130). Thus, if database 120 changes, business logic layer 104 may not be affected; that is, formatted variable abstraction procedure 118 may be modified without requiring modification of generate function 114.

Figure 3:
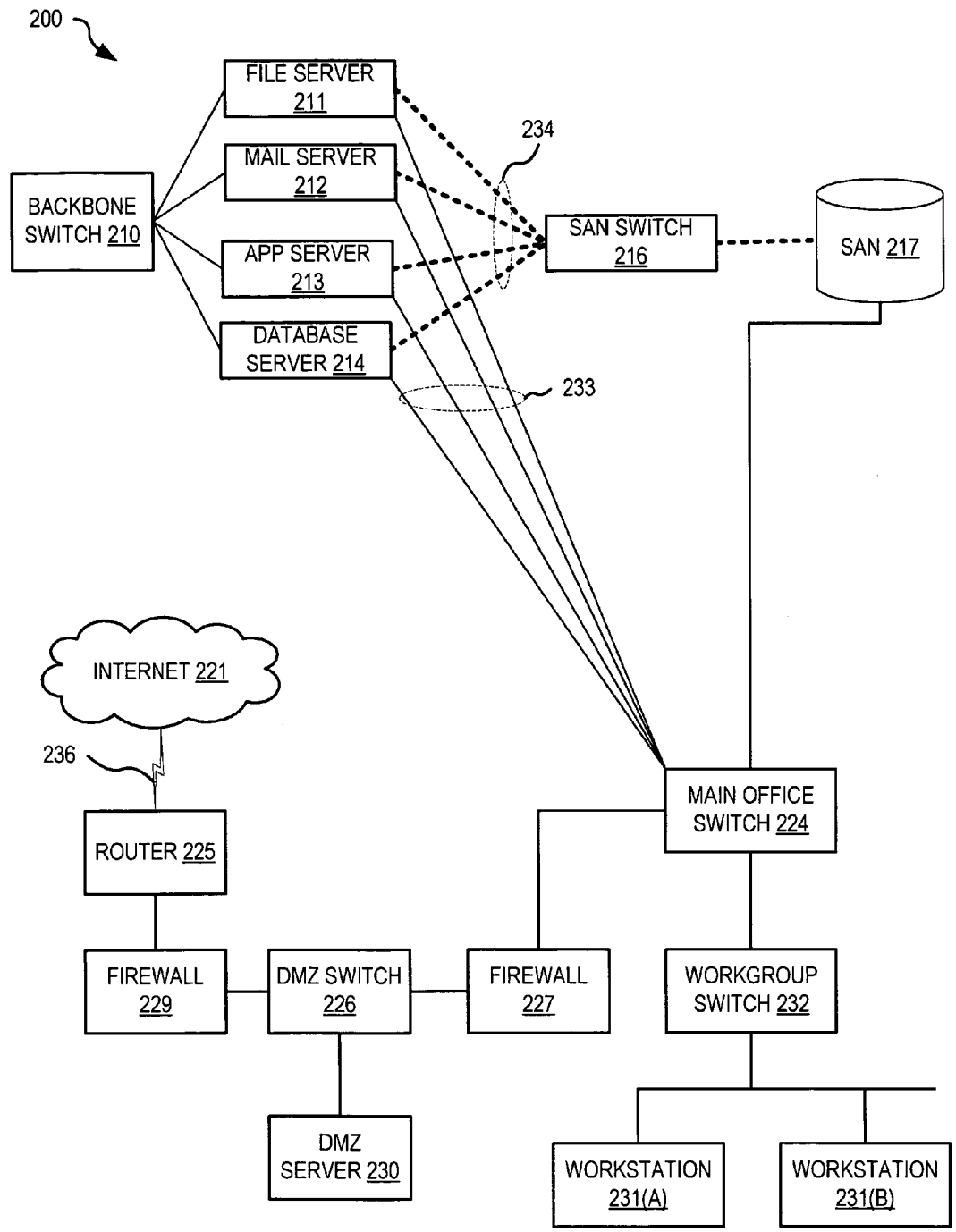
FIG. 3 shows one exemplary system for data abstraction using formatted system variables.

FIG. 3 shows one exemplary system 200 for data abstraction using formatted system variables. Data processing system 200 is illustratively shown with servers 211, 212, 213, 214 and 230, workstations 231, storage area network 217, switches 210, 216, 224, 226 and 232, a router 225, firewalls 227 and 229 and Internet 221. File server 211 may be used to store input and output files as well as program files. These program files may be used in the presentation layer and executed by either application server 213, workstation 231 or a remote personal computer (not shown) connected to computer system 200 via internet 221. An operating system (OS) running on file server 211 may be one of: Novell Netware, Linux, and Microsoft Windows Server. An OS running on workstation 231 may be Microsoft Windows, Linux or other such OS running a browser application such as Microsoft Internet Explorer, Mozilla, Firefox, or Netscape Navigator. Mail server 212 may be used to deliver formatted output to designated individuals as e-mail, for example.

Application server 213 may operate as an Oracle Application Server supporting JAVA, forms services, and report services. As such, an application server that supports JAVA may be used where the presentation layer is developed in JAVA. Other languages and tools may be used without departing from the scope hereof.

Mail server 212 may also communicate database requests and responses between database server 214 and remote database users. Multiple application servers 213 may also be implemented to improve performance.

Database server 214 may run Oracle as a relational database but other relational databases may be used without departing from the scope hereof. The data access layer 106 (FIG. 2) and much of the business logic layer 104 may be stored on database server 214. Client business logic 112 may, for example, be written in PL/SQL although JAVA or other languages supported by database server 214. Multiple database servers (e.g., database server 214) may be implemented as a cluster to improve performance of relational database access. Data and business software logic associated with subsystems of each architectural tier may be housed in database server 214.

Other servers may provide services such as a web server, e-mail gateway, etc. Servers 211, 212, 213 and 214 may include one or more local disks or may connect to storage area network (SAN) 217 and thus may not contain local disks. Servers 211, 212, 213 and 214 may also contain multiple network interface cards (NIC) that allow connection to a server backbone 210 to increase communication performance between servers 211, 212, 213 and 214.

Fiber optical connections 234 are illustratively shown connecting servers 211, 212, 213 and 214 to SAN switch 216. Servers 211, 212, 213 and 214 are also illustratively shown connecting to a main office switch 224 via Ethernet network cables 233 and may utilize internet protocol (IP) traffic.

A user may access resources of data processing system 200 using workstations 231 (e.g., workstations 231(A) and 231 (B)). Each workstation 231 may, for example, run Windows OS or Linux. Workstations 231 may, for example, run a web browsing application ('browser') such as Mozilla or Microsoft Internet Explorer. The browser may load an Oracle browser JAVA plug-in to enhance the browser's capabilities and provide many keyboard functions to enhance user productivity. Workstations 231 are illustratively shown connecting into the network via workgroup switch 232 and main office switch 224.

Users may also access resources of data processing system 200 via internet 221 through router 225, firewalls 227 and 229 and data management zone (DMZ) network switch 226. DMZ network switch 226 is shown facilitated by DMZ server 230. If application server 213 is implemented as an Oracle Application server, DMZ server 230 may contain Oracle Web Cache software running on a web server (e.g., Apache).

Network connections between SAN 217 and main office switch 224 allow SAN 217 to be managed by one or more of workstations 231.

FIG. 2 and FIG. 3 are best viewed together with the following example of operation. A user interacts with workstation 231(A) to invoke presentation function 108 within application server 213 to generate a display of view of letter 110, upon a screen of workstation 231(A). Application server 213 then invokes generate function 114 of client business logic 112, also within application server 213, to resolve reference 117 within dynamic letter 116 stored by file server 211. Specifically, generate function 114 invokes formatted variable abstraction procedure 118, which is also located within application server 213, to retrieve formatted system variable result 111 from database 120 of database server 214. Detail of this retrieval is described below and shown in FIG. 4. Upon return of formatted system variable result 111, application server 213, using presentation function 108, displays view of letter 110 including formatted system variable result 111 upon the screen of workstation 231(A).

Figure 4:
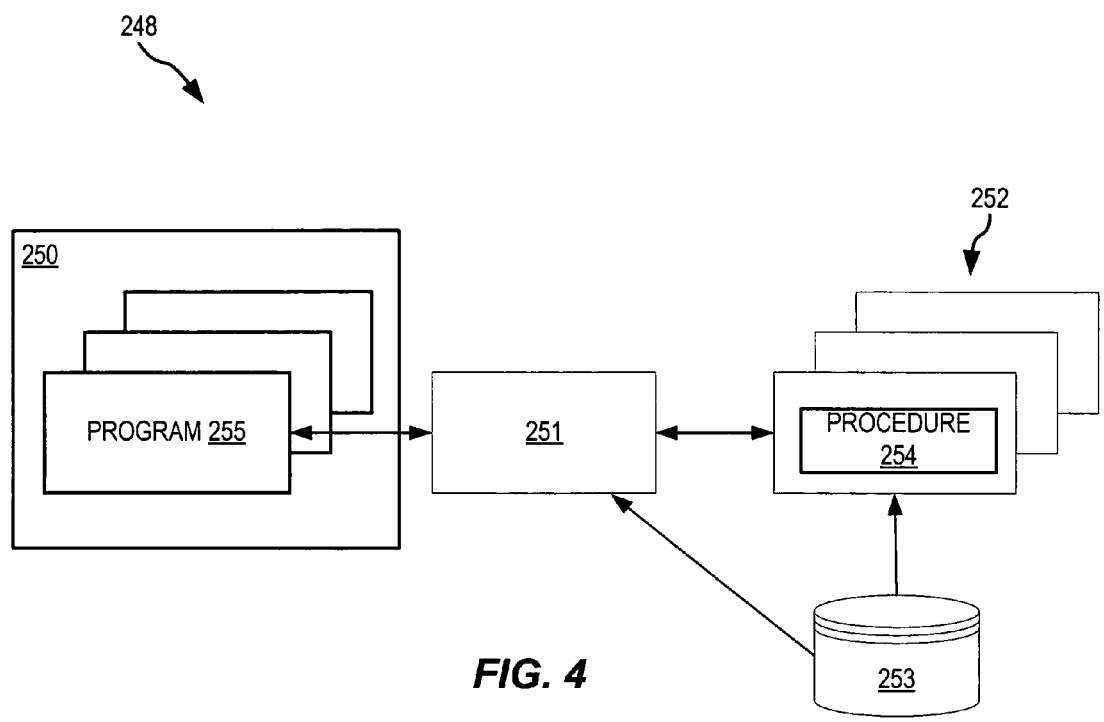
FIG. 4 is a data flow diagram showing interaction between a business logic layer and a data access layer during data retrieval.

FIG. 4 shows a data flow diagram 248 illustrating input and output information flow for retrieval of formatted system variable results (e.g., formatted system variable result 111, FIG. 2) from an application system database 253 by an application system program 255 within an application system program module 250. Database 253 may, for example, represent tables of database 120, FIG. 2; application system program module 250 may represent client business logic 112; and application system program module 255 may represent generate function 114. Each application system program 255 may retrieve one or more data items from application system database 253.

In an example of operation, application system program module 255 calls a formatted variable abstraction procedure 251 for each data value retrieved. Formatted variable abstraction procedure 251 is, for example, a database procedure and may represent formatted variable abstraction procedure 118. Input parameters passed during the call to formatted variable abstraction procedure 251 may include a tag name and a key value. Formatted variable abstraction procedure 251 builds a dynamic SQL statement that calls an appropriate procedure (e.g., a procedure 254) in one of database packages 252. Formatted variable abstraction procedure 251 may, for example, utilize a formatted variables table (e.g., formatted variables table 126, FIG. 2) within application system database 253 to identify procedure 254

Procedure 254 then retrieves data from application system database 253, formatting it as needed, and returns the data to formatted variable abstraction procedure 251 in the following parameters: return status, return value, subject key value and image. Procedure 251 then in turn responds back to program 255 with these same parameters. The return value may represent formatted system variable result 111, FIG. 2.

Static values may also be defined in the formatted variables table (e.g., formatted variable table 126, FIG. 2) in application system database 253, in which case procedure 251 retrieves a value from the formatted variables table and returns the value to application system program module 250 as formatted system variable result 111. Static values are values that do not change. For example, instead of storing frequently used text that does not change need within the business system, the text may be stored as a formatted variable.

FIG. 5 lists data columns in a database table named FORMATTED_VARIABLES. FORMATTED_VARIABLES may represent formatted variables table 126, FIG. 2. Each column of FORMATTED_VARIABLES is described below.

ID A system generated sequence number that uniquely identifies each entry. This is the primary key to the formatted_variables table.

TAG_NAME The user oriented label of the variable that is returned by the function. This can be used in specifying merge text, such as in a letter system. FIG. 9 has an example of a tag_name of "long_date".

PROG_ID Program reference number. The number assigned to a packaged database procedure that performs the retrieval of the value identified by the tag_name. See the "id" column in FIG. 6.

IMAGE Is the data item for this database function an image? If "Yes", then the data item is an image and the system returns the ID instead of the image. The letter print program takes that ID and, based on the table indicated by the associated letter insert variable, selects the image. The ID is stored in the Image Id item in the letter transaction table. If "No", then the data item is not an image and the system stores the returned data in the letter transaction merge text data item.

IMAGE_FILE_FORMAT The image file format. This is used to indicate the file format to the presentation software. Example of some image formats include: jpg, gif, bmp, tiff, pdf.

DATA_TYPE The type of data represented by the data returned as a formatted variable value. The primary purpose of this value is for documentation. The following are the valid data type formats.

Character—Alpha numeric.

Number

Date—Must be formatted 'MM-DD-YYYY'

Date time—Must be formatted 'MM-DD-YYYY HH24:MM:SS"

ST_TABLE_SHORT_NAME The short name of the database table that contains the data row that is the entry point for the formatted variable. A database table that has referenced formatted variables has an assigned table short name for the table used by the supplied business key value (parameter p_key_value in AIS_P009_GET_FV procedure). The short name is used as an abbreviated identifier of the longer table name. Some formatted variables are not associated with a specific table but are derived from system variables such as the current system date. These variables reference a table short name of "NOOP".

SOURCE_DATA_ST_TABLE_NAME The short name of the table that is the source of the data for this formatted variable. The data for the variable is stored in this table. This value is used in conjunction with the p_subject_ key_value returned by procedure AIS_P009_GET_FV. The calling program does not normally utilize this data but the values may be used later to directly retrieve the data from the source table.

USER_MODIFIABLE This flag is used in business system applications such as the production of automated correspondence.

If "Yes" then the user is given the opportunity to modify the returned text after it is retrieved.

If "No" then the user cannot modify the returned text after it is retrieved.

Normally, this is used in letter processing and allows a user to modify or add to the text after it was returned by the formatted variable routine.

ALTERNATE_FIXED_VALUE A constant value that can be used in lieu of a system variable. This value can be, for example, a constant text string that is returned for a purpose including a block of text to be merged in a generated letter. For formatted variables that indicate "user modifiable", this text represents the starting text for the user-entered text.

When a value is specified then the function name is ignored. A "NOOP" (no operation) function can be specified.

SHORT_DESCRIPTION Optional short description that describes the format of the text returned by the function represented by this entry. Normally, only special letter insert valuables, such and LAST_NAME_FIRST_NAME, need descriptions. The short description is used when a user must know what kind of data the formatted variable represents.

FIG. 6 lists the data columns in the database table named PROGRAMS. The description of each column in table PROGRAMS is shown below.

ID A system generated sequence number that uniquely identifies each entry. This is the primary key to the programs table.

PACKAGE_NAME The name of the package that the procedure belongs to. The package name is used when this program is a procedure that is part of a package. The example stated in this document is named AIS_P008_SYS_VALUES in FIG. 9.

PROGRAM_NAME The computer program file name used to identify a computer program. Computer programs are created to provide data entry and enquiry forms, reports and data procedures. For procedures, when incorporated in a package, the package name must be set. Example names shown in FIG. 9 include: status_fail, chk_length, long_ date.

The period character between the package name and the procedure/function name is added when building the full name of the package procedure.

PROGRAM_TYPE The major type of program such as: form (F), report (R), procedure (P).

PROGRAM_TITLE The title of the form or report program. This is the descriptive name that is shown as a title at the top of a screen or report.

DESCRIPTION Optional free form text used to describe this program.

NOTES Any additional information about this report program. This would be a good place to keep information about any related programs.

FIG. 7 lists the data columns in the database table named SYSTEM_TABLES. The description of each column of the table named SYSTEM_TABLES is shown below. This table is used to validate both ST_TABLE_SHORT_NAME and SOURCE_DATA_ST_TABLE_NAME column foreign key references in the FORMATTED_VARIABLES table.

TABLE_SHORT_NAME An abbreviation of the table name that uniquely identifies each entry. This is the primary key to the system_tables table.

TABLE_NAME The table name as it is named in the database.

DISPLAY_NAME The name or title of the table that is displayed to users.

TABLE_EXISTS A flag that indicates whether or not the table has been created in the database. Y=Yes, N=No.

FIG. 8 is a source code listing for one exemplary database procedure named AIS_P009_GET_FV written in a PL/SQL language. Database procedure AIS_P009_GET_FV may, for example, represent formatted variable abstraction procedure 251 of FIG. 4. Database procedure AIS_P009_GET_FV may be implemented as a database stored procedure, for example. Database procedure AIS_P009_GET_FV receives at least two input parameters, a tag name (P_TAG_NAME) and an "entry" key value (P_KEY_VALUE), which are used in construction of a dynamic SQL statement. This dynamic SQL statement calls one or more procedures (e.g., procedure 254) of database packages 252 to render the desired formatted variable. See FIG. 9 and FIG. 10 for exemplary source code listings of database packages 252.

In the following example of operation, the current date is to be formatted as "Month DD, YYYY" (e.g., "May 19, 2005") and returned as a formatted variable (e.g., formatted system variable result 111, FIG. 2) to program 255, FIG. 4. A value for p_key_value is not required in this example as the current date is a value returned by an in-memory system variable. Code Sample 1 may represent part or all of program 255, FIG. 4. Code Sample 1 shows exemplary invocation of procedure ais_p009_get_fv with a tag name of "long_date" and evaluation of returned parameters.

| Code Sample 1 Using procedure AIS_P009_GET_FV to return long_date |
|---|

```
exec ais_p009_get_fv
      (p_tag_name => "long_date",
       p_key_value => null,
       p_subject_key_value => null,
       p_image => null,
       p_return_status,
       p_return_value);
if p_return_status = 'SUCCESS' then
      -- normal logic that uses the value in p_return_value
else if p_return_status = 'FAIL' then
      -- logic that handles a failure when no data was available
else if p_return_status = 'OVERFLOW' then
      -- logic that handles when the formatted value result is over 4,000
      -- bytes likely includes normal logic that uses the value
      p_return_value
else
      -- logic that handles an invalid return status value.
```

Upon return of control from procedure ais_p009_get_fv, a returned status is first checked to determine if ais_p009_get_fv was successful. If the returned status indicates success (i.e., p_return_status equals "SUCCESS") the returned value of p_return_value contains the current date formatted appropriately. If the returned status does not indicate success, further logic may, for example, determine a cause of the failure.

FIG. 9 shows exemplary source code, written in PL/SQL language, for a package of software programs named AIS_P008_SYS_VALUES. Package AIS_P008_SYS_VALUES may, for example, represent one package of database packages 252, FIG. 4. Package AIS_P008_SYS_VALUES may be implemented as a database package of stored procedures. Package AIS_P008_SYS_VALUES includes procedures that may be called from formatted variable abstraction procedure 251. In the example shown, the procedure "long_date" is called. It's purpose happens to be to return a formatted date such as "May 5, 2005". The program code responsible for determining the value is shown in Code Sample 2 below.

| Code Sample 2 Determining The Value |
|---|

```
select rtrim(to_char(sysdate,'Month')) || to_char(sysdate,' dd, YYYY')
      into v$_formatted_value
      from dual;
```

Code Sample 2 may, for example, be replaced by any other SQL statement, or other logic, that places a formatted variable result into a global variable called "v$_formatted_value". Code Sample 2 may be stored once and need not be repeated throughout the system.

FIG. 9 shows exemplary source code for package AIS_P008_SYS_VALUES. Package AIS_P008_SYS_VALUES may, for example, represent one package of database packages 252, FIG. 4. Package AIS_P008_SYS_VALUES contains three procedures: status_fail, chk_length and long_date. Procedure chk_length determines if the value of the formatted variable is greater than 4,000 bytes longs and, if so, returns an "OVERFLOW" status. Procedure status_fail returns a "FAIL" status, and is called by a procedure, such as "long_date" or "clc.insured_first_name", if it cannot return a value. Otherwise, a status of "SUCCEED" is normally returned.

In a second example, Code Sample 3 shows one exemplary invocation of procedure ais_p009_get_fv to retrieve a text value that represents a person's first name based upon an insurance claim charge submitted on their behalf. In this example, the identifier of the claim charge is "123456", and therefore p_key_value is set to the value "123456" to enable location of the database row of the claim charge. The tag name that identifies the stored procedure is "clc.insured_first_name". Once executed, this procedure returns the first name of the person in the parameter named p_return_value. The primary key identifier of the row that stores the insured's name will be returned in the variable named p_subject_key_value. The returned subject key value may be used by the calling program to directly read the identified row at a later time if required.

| Code Sample 3 Using procedure AIS_P009_GET_FV to get an Insured First Name |
|---|

```
exec ais_p009_get_fv
(p_tag_name => "clc.insured_first_name",
 p_key_value => 123456,
 p_subject_key_value => null,
 p_image => null,
 p_return_status,
 p_return_value);
if p_return_status = 'SUCCESS' then
      -- normal logic that uses the value in p_return_value
else if p_return_status = 'FAIL' then
      -- logic that handles a failure when no data was available
else if p_return_status = 'OVERFLOW' then
      -- logic that handles when the formatted value result is over 4,000
      -- bytes likely includes normal logic that uses the value
      p_return_value
else,
      -- logic that handles an invalid return status value.
```

If procedure ais_p009_get_fv has completed successfully then p_return_value contains the first name of the insured (e.g. "Fred") whose claim identifier is "123456". The value for p_subject_key_value contains an identifier (key value) of a row in the database table in which the name is stored. (This subject key value is normally used only for debugging.) In this example, the p_image value is null since an image value is not being retrieved.

FIG. 10 is a package of software programs, written in PL/SQL language, named AIS_P007_CLAIM_CHARGE_VALUES. Package AIS_P007_CLAIM_CHARGE_VALUES may, for example, represent one package of database packages 252, FIG. 4. Package AIS_P007_CLAIM_CHARGE_VALUES may, for example, be implemented as a database package of stored procedures. Package AIS_P007_CLAIM_CHARGE_VALUES includes a procedure called "insured_first_name" that may be called by procedure AIS_P009_GET_FV (see FIG. 8). Procedure "insured_first_name" retrieves the first name of a person based upon the identifier of a particular insurance claim charge (passed as the p_key_value parameter). Thus, the claim charge identifier is an entry point, representing the key value of the claim_charges table that enables the desired formatted variable to be retrieved. Specifically, p_tag_name identifies a procedure to be called, and p_key_value locates a specific row in the database containing the data to be retrieved.

Package AIS_P007_CLAIM_CHARGE_VALUES may include many other procedures that retrieve other business data values without departing from the scope hereof. A recommended organization of each package is to only include procedures that use the same entry point (i.e., where p_key_value represents the same information, such as claim charge identifier, for each externally invoked procedure within the package).

Figure 11:
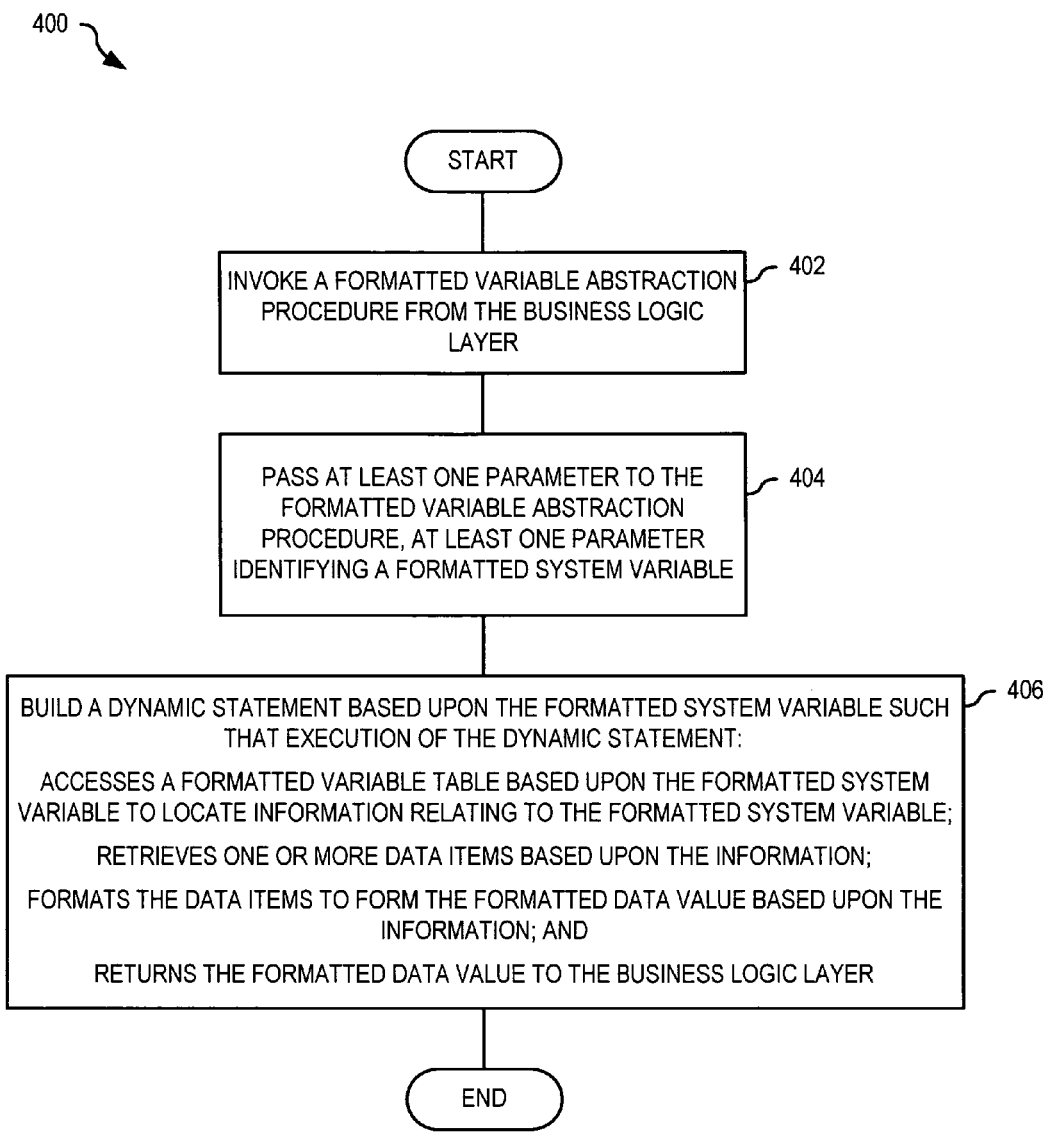
FIG. 11 shows one exemplary method for data abstraction using formatted system variables.

FIG. 11 shows one exemplary method 400 for data abstraction using formatted system variables. In step 402, method 400 invokes a formatted variable abstraction procedure from the business logic layer. In one example of step 402, generate function 114, FIG. 2, invokes formatted variable abstraction procedure 118. In step 404, method 400 passes at least one parameter to the formatted variable abstraction procedure, the at least one parameter identifying a formatted system variable. In one example of step 404, as shown in Code Sample 1, program 255, FIG. 4, passes a parameter of "long_date" to formatted variable abstraction procedure 251. In step 406, method 400 builds a dynamic statement based upon the formatted system variable such that execution of the dynamic statement:

- accesses a formatted variable table based upon the formatted system variable to locate information relating to the formatted system variable;
- retrieves one or more data items based upon the information;
- formats the data items to form the formatted data value based upon the information; and
- returns the formatted data value to the business logic layer.

In one example of step 406, procedure AIS_P009_GET_FV, invoked by Code Sample 3, builds a dynamic statement, "plsql_block", to invoke procedure "insured_first_name" within package "AIS_P007_CLAIM_CHARGE_VALUES," to return the first name of the insured whose claim identifier is "123456".

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for retrieving a formatted data value from a data layer to a business logic layer, comprising:
   invoking a first procedure within the business logic layer the first procedure being a formatted variable abstraction procedure preprogrammed for a particular formatted variable; passing at least one parameter to the first procedure, the at least one parameter identifying a formatted system variable; and
   selecting, from a table of formatted variables and based upon the formatted system variable, a second procedure, the second procedure being a separate procedure from the first procedure;
   building, within the first procedure, a dynamic statement to identify the second procedure from the table, such that execution, by the first procedure, of the dynamic statement invokes the second procedure to: retrieve one or more data items from the data layer; format the data items, within the second procedure, to form a formatted data value before returning from the dynamic statement; and return the formatted data value to the dynamic statement, and return the formatted data value from the dynamic statement to the business logic layer via the first procedure,
   wherein the at least one parameter includes one or more of tag name, key value, return status, return value, subject key value, and image.

2. The method of claim 1, wherein the first procedure returns an alternate fixed value when the second procedure is not found.

3. The method of claim 1, wherein a second parameter passed to the first procedure is passed to the second procedure by the dynamic statement to identify the data items.

4. The method of claim 1, wherein the returned formatted data value is only a string of characters.

5. The method of claim 1, wherein, for the formatted system variable, the table of formatted variables defines whether the returned formatted data value is user modifiable.

6. A method for data abstraction between a business logic layer and a data layer, comprising:
   invoking a first procedure from the business logic layer with at least one parameter identifying a formatted system variable, the first procedure being a data abstraction procedure preprogrammed for a particular data value;
   accessing, from the first procedure, a first database table in the data layer to retrieve a database package name and a database program name of a second procedure based upon the formatted system variable, the second procedure being a separate procedure from the first procedure;
   building, if the package name indicates that the second procedure is valid, a dynamic statement within the first procedure that, upon execution, invokes the second procedure within the data layer to retrieve and format a data value from the data layer procedure; retrieving, if the package name and program name does not indicate the valid procedure, an alternate fixed value from the first database table based upon the formatted system variable and assigning it to the formatted data value; and returning the formatted data value to the business logic layer,
   wherein the at least one parameter includes one or more of tag name, key value, return status, return value, subject key value, and image.

7. The method of claim 6, the step of building comprising:
   accessing, from the second procedure invoked within the first procedure, at least one additional database table based upon a second parameter to retrieve additional data for inclusion in the formatted data value.

8. The method of claim 6, wherein the dynamic statement is a dynamic SQL statement.

9. The method of claim 6, further comprising returning a status indicating success or failure of returning the formatted data value.

10. The method of claim 9, further comprising validating length of the data value before return.

11. A software product comprising instructions, stored on physical computer-readable non-transitory media, wherein the instructions, when executed by a computer, perform steps for data abstraction between a business logic layer and a data layer, comprising:
   instructions for invoking a first procedure from the business logic layer with at least one parameter identifying a formatted system variable, the first procedure being a data abstraction procedure preprogrammed for a particular data value;
   instructions for accessing, from the first procedure, a first database table in the data layer to retrieve a package name and program name based upon the formatted system variable;
   instructions for building, if the package name indicates a valid package, a dynamic statement within the first procedure that, upon execution, invokes a second procedure within the data layer, identified by the program name and the package name, to retrieve a formatted data value from the data layer and return the formatted data value from the dynamic statement, the second procedure being a separate procedure from the first procedure; instructions for retrieving, if the package name does not indicate a valid package, an alternate fixed value for use as the formatted data value from the first database table based upon the formatted system variable; and instructions for returning the formatted data value to the business logic layer, wherein the at least one parameter includes one or more of tag name, key value, return status, return value, subject key value, and image.

12. The method of claim 11, the step of building comprising:
accessing, from the invoked first procedure, at least one additional database table based upon a second parameter to retrieve additional data for inclusion in the formatted data value.

13. The method of claim 11, wherein the dynamic statement is a dynamic SQL statement.

14. The method of claim 11, further comprising returning a status indicating success or failure of returning the formatted data value.

15. The method of claim 11, further comprising validating length of the data value before return.

16. A system stored in a non-transitory computer-readable medium for data abstraction between a business logic layer of an application server and a data layer of a database server, wherein the application server and the database server are implemented by a computer, comprising: means for invoking, within the application server, a formatted variable abstraction procedure from the business logic layer;
means for passing, within the application server, at least one parameter to the formatted variable abstraction procedure, the at least one parameter identifying a formatted system variable; and
means for building a dynamic statement based upon the formatted system variable such that execution of the dynamic statement within the application server:
accesses a formatted variable table within the database server based upon the formatted system variable to locate information within the data layer relating to the formatted system variable;
retrieves one or more data items from the database server based upon the information;
formats the data items to form the formatted data value based upon the information; and
returns the formatted data value to the business logic layer
wherein the parameter includes one or more of tag name, key value, return status, return value, subject key value, and image, and
means for returning a status indicating success or failure of returning the formatted data value.

17. The system of claim 16, wherein the dynamic statement is a dynamic SQL statement.

18. The system of claim 16, wherein a second parameter passed to the formatted variable abstraction procedure identifies the data items.

19. The system of claim 16, further comprising means for validating the length of the formatted data value.

20. The system of claim 3, wherein the second parameter includes one or more of return status, return value, subject key value, and image.

21. The system of claim 7, wherein the second parameter includes one or more of return status, return value, subject key value, and image.

22. The system of claim 12, wherein the second parameter includes one or more of return status, return value, subject key value, and image.

* * * * *